(12) United States Patent
Gavali et al.

(10) Patent No.: US 11,086,683 B2
(45) Date of Patent: Aug. 10, 2021

(54) REDISTRIBUTING WORKLOADS ACROSS WORKER NODES BASED ON POLICY

(71) Applicant: International Business Machines Corporation, Armonk, NY (US)

(72) Inventors: Pramod V. Gavali, Pune (IN); Neeraj Kumar Kashyap, Bangalura (IN); Shashidhar Bomma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/413,852

(22) Filed: May 16, 2019

(65) Prior Publication Data
US 2020/0364086 A1    Nov. 19, 2020

(51) Int. Cl.
| G06F 9/46 | (2006.01) |
| G06F 9/50 | (2006.01) |
| G06F 11/20 | (2006.01) |
| G06F 11/07 | (2006.01) |

(52) U.S. Cl.
CPC ............ *G06F 9/505* (2013.01); *G06F 9/5072* (2013.01); *G06F 9/5077* (2013.01); *G06F 11/0709* (2013.01); *G06F 11/203* (2013.01); *G06F 2209/503* (2013.01); *G06F 2209/5022* (2013.01)

(58) Field of Classification Search
None
See application file for complete search history.

(56) References Cited

U.S. PATENT DOCUMENTS

| 8,341,626 | B1 | 12/2012 | Gardner et al. | |
| 9,529,638 | B2 * | 12/2016 | Attalla | G06F 9/5077 |
| 2010/0169253 | A1 | 7/2010 | Tan | |
| 2017/0177860 | A1 | 6/2017 | Suarez et al. | |
| 2017/0199770 | A1* | 7/2017 | Peteva | G06F 9/5088 |

(Continued)

FOREIGN PATENT DOCUMENTS

WO    WO2018052528 A1    3/2018

OTHER PUBLICATIONS

Kubernetes, "Production-Grade Container Orchestration, Automated container deployment, scaling, and management," The Linux Foundation, copyright 2019, accessed May 16, 2019, 8 pages. https://kubernetes.io/.

(Continued)

*Primary Examiner* — Kenneth Tang
(74) *Attorney, Agent, or Firm* — Yee & Associates, P.C.

(57) ABSTRACT

Workload redistribution is provided. Upper and lower thresholds of resource utilization by worker nodes in a worker node group are defined. Hot and cold regions are determined in the worker node group to provide policy-based rescheduling of the worker nodes and redistribution of workload on the worker nodes based on the upper and lower thresholds of resource utilization. Resource utilization data corresponding to the worker nodes in the worker node group are collected at defined time intervals. It is determined whether an average resource utilization of any worker node in the worker node group is greater than the upper threshold of resource utilization based on the collected resource utilization data. In response to determining that the average resource utilization of any worker node in the worker node group is greater than the upper threshold, redistribution of the workload on the worker nodes is triggered.

18 Claims, 12 Drawing Sheets

(56) References Cited

U.S. PATENT DOCUMENTS

2017/0300359 A1* 10/2017 Kollur .................. G06F 9/4881
2018/0063025 A1    3/2018 Nambiar et al.
2018/0109610 A1*  4/2018 Einkauf ............. H04L 43/0876

OTHER PUBLICATIONS

Kubernetes, "Assigning Pods to Nodes," The Linux Foundation, copyright 2019, accessed May 16, 2019, 15 pages. https://kubernetes.io/docs/concepts/configuration/assign-pod-node/.

Prometheus, "Overview," The Linux Foundation, copyright 2019, accessed May 16, 2019, 4 pages. https://prometheus.io/docs/introduction/overview/.

Wikipedia, "k-means clustering," Wikimedia Foundation, Inc., accessed May 16, 2019, 14 pages. https://en.wikipedia.org/wiki/K-means_clustering.

IBM, "Scheduling jobs with IBM Tivoli Workload Scheduler," accessed May 16, 2019, 4 pages. https://www.ibm.com/support/knowledgecenter/en/SSPLFC_7.3.0/com.ibm.taddm.doc_7.3/AdminGuide/c_cmdb_scheduling_jobs_ws.html.

IBM, "IBM LoadLeveler: Version 5, Release 1," copyright 2010, 2012, 20 pages. https://www.ibm.com/support/knowledgecenter/en/SSFJTW/loadl51/loadl_v5r1_doc_update.pdf.

* cited by examiner

US 11,086,683 B2

REDISTRIBUTING WORKLOADS ACROSS WORKER NODES BASED ON POLICY

BACKGROUND

1. Field

The disclosure relates generally to workload distribution and more specifically to rescheduling workloads across worker nodes of a workload orchestration environment to redistribute the workloads based on policy.

2. Description of the Related Art

In current workload orchestration environments, such as, for example, Kubernetes, when worker nodes are removed and added back into the cluster of worker node groups during a maintenance cycle, the workload orchestration environment only schedules and places new workloads (e.g., Pods) on newly added worker nodes to the cluster. This causes an uneven distribution of workloads within individual worker node groups and across the cluster of worker node groups. The workload orchestration environment, which is a cluster of interconnected physical and/or virtual nodes (i.e., machines), provides automatic deployment, scaling, and management of containerized applications.

The cluster of worker node groups contains two types of computing nodes, a master node and a worker node. The master node is responsible for managing worker nodes in the cluster. The master node is the entry point for all operation to be executed in the cluster that are received from, for example, an application programming interface, a user interface, or a command line interface. The worker node is responsible for running one or more workloads and networking with different workloads running on other worker nodes in the cluster. Features of current workload orchestration environments may include, for example, quick application deployment, auto-recovery and self-healing, and seamless application update.

SUMMARY

According to one illustrative embodiment, a computer-implemented method for workload redistribution is provided. A computer defines an upper threshold and a lower threshold of resource utilization by worker nodes in a worker node group within a cluster of worker node groups corresponding to a workload orchestration environment. The computer determines a hot region and a cold region in the worker node group to provide policy-based rescheduling of the worker nodes and redistribution of workload on the worker nodes based on the upper threshold and the lower threshold of resource utilization. The computer collects resource utilization data corresponding to the worker nodes in the worker node group at defined time intervals. The computer determines whether an average resource utilization of any worker node in the worker node group is greater than the upper threshold of resource utilization based on the collected resource utilization data. In response to the computer determining that the average resource utilization of any worker node in the worker node group is greater than the upper threshold of resource utilization based on the collected resource utilization data, the computer triggers redistribution of the workload on the worker nodes in the worker node group. According to other illustrative embodiments, a computer system and computer program product for workload redistribution are provided.

DETAILED DESCRIPTION

Figure 1:
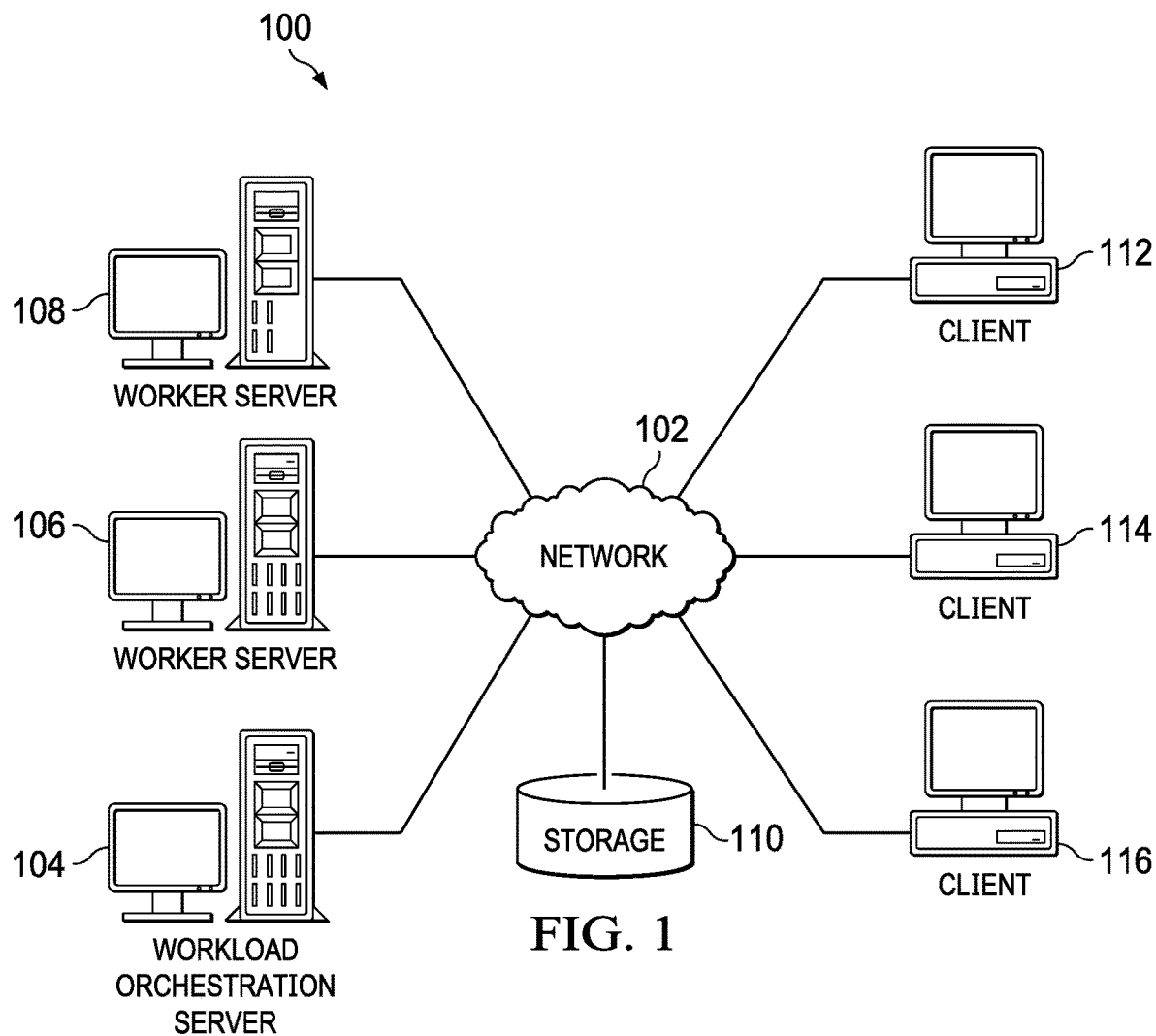
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
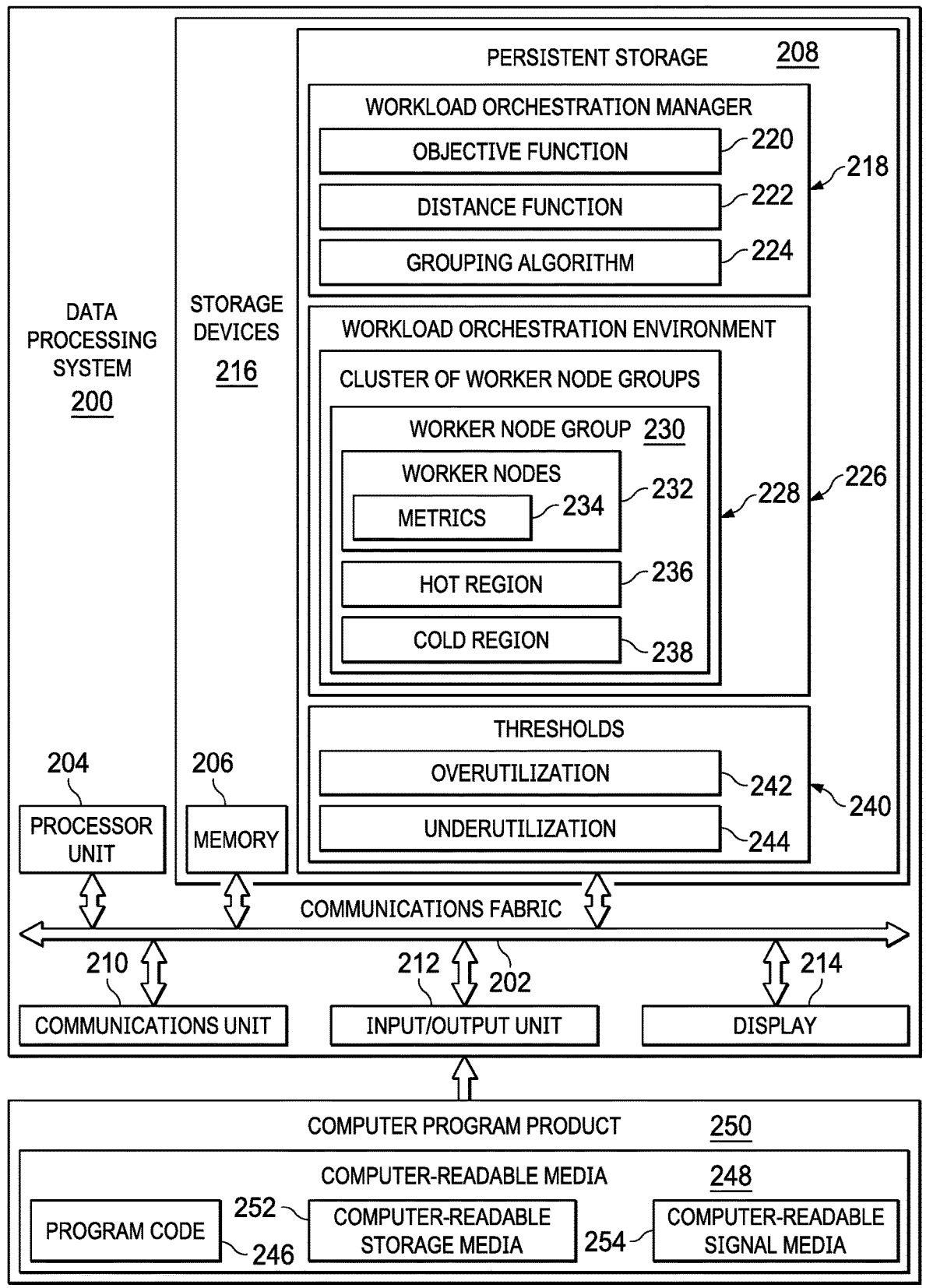
FIG. 2 is a diagram of a data processing system in which illustrative embodiments may be implemented.
Figure 3:
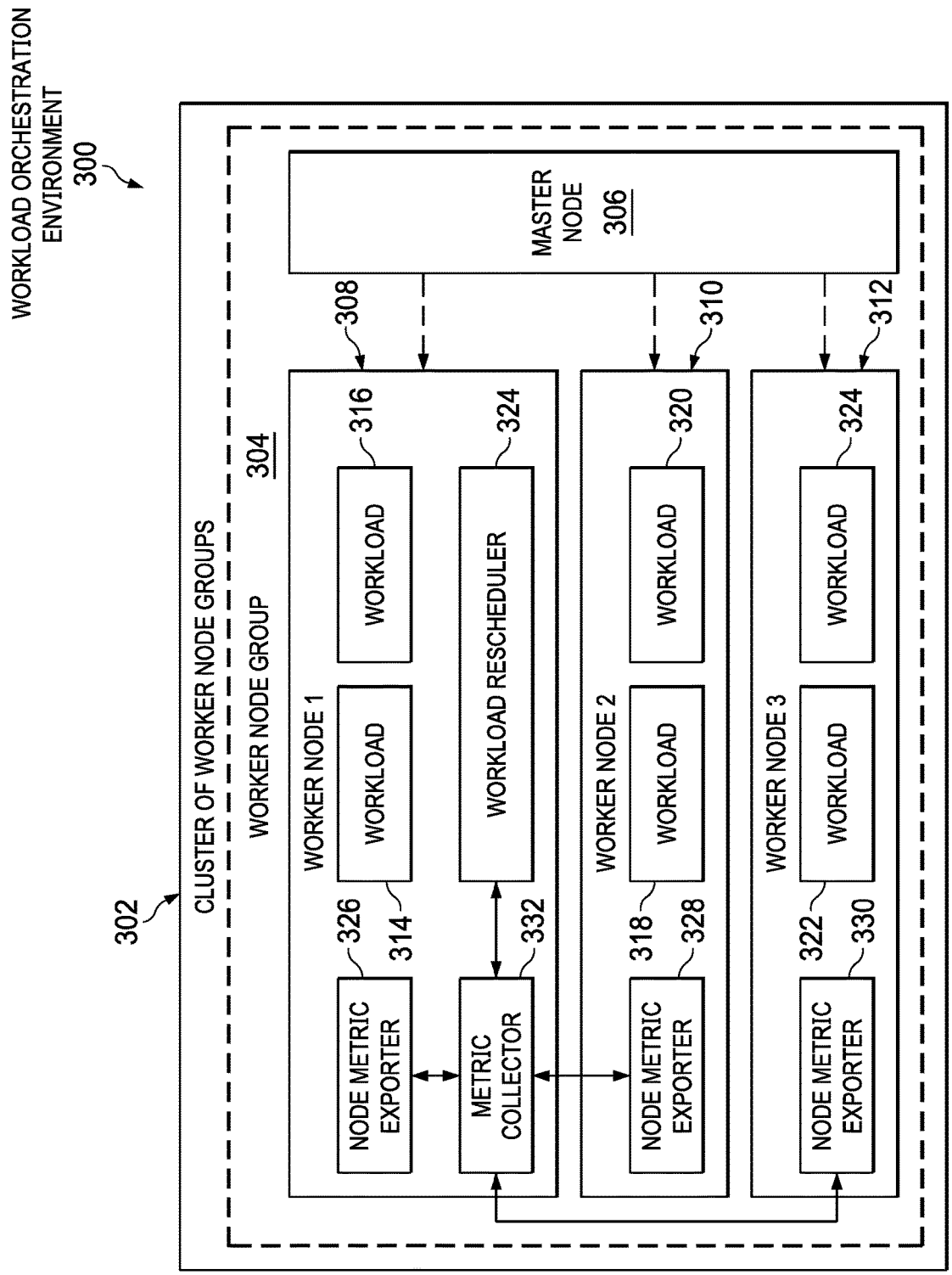
FIG. 3 is a diagram illustrating an example of a workload orchestration environment in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, workload orchestration server 104, worker server 106, and worker server 108 connect to network 102, along with storage 110. Workload orchestration server 104, worker server 106, and worker server 108 may be, for example, server computers with high-speed connections to network 102. Workload orchestration server 104 reschedules workloads across worker server 106 and worker server 108 to redistribute the workloads based on policy.

It should be noted that workload orchestration server 104, worker server 106, and worker server 108 are included in a workload orchestration environment. Also, it should be noted that workload orchestration server 104, worker server 106, and worker server 108 may each represent a plurality of computing nodes in one or more cloud environments that manage workloads. Alternatively, workload orchestration server 104, worker server 106, and worker server 108 may each represent a plurality of servers in a data center. In addition, worker server 106 and worker server 108 may provide one or more services, such as, for example, event monitoring services, financial services, banking services, governmental services, educational services, reservation services, data services, search services, and the like, to client devices, that make up the workloads.

Client 112, client 114, and client 116 also connect to network 102. Clients 112, 114, and 116 are clients of worker server 106 and worker server 108. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to access and utilize the services provided by worker server 106 and worker server 108.

Storage 110 is a network storage device capable of storing any type of data in a structured format or an unstructured format. In addition, storage 110 may represent a plurality of network storage devices. Further, storage 110 may store identifiers and network addresses for a plurality of different worker servers, worker server metrics, worker server resource utilization thresholds, identifiers and network addresses for a plurality of different client devices, identifiers for a plurality of different users, and the like. Furthermore, storage 110 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on workload orchestration server 104 and downloaded to worker server 106 over network 102 for use on worker server 106.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as workload orchestration server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores workload orchestration manager 218. However, it should be noted that even though workload orchestration manager 218 is illustrated as residing in persistent storage 208, in an alternative illustrative embodiment workload orchestration manager 218 may be a separate component of data processing system 200. For example, workload orchestration manager 218 may be a hardware component coupled to communication fabric 202 or a combination of hardware and software components. In another alternative illustrative embodiment, a first set of components of workload orchestration manager 218 may be located in data processing system 200 and a second set of components of workload orchestration manager 218 may be located in a second data processing system, such as, for example, worker server 106 in FIG. 1.

Workload orchestration manager 218 controls the process of rescheduling workloads across worker nodes of a workload orchestration environment to redistribute the workloads based on policy. In this example, workload orchestration manager 218 includes objective function 220, distance function 222, and grouping algorithm 224. Workload orchestration manager 218 utilizes objective function 220 to measure performance of worker nodes and groups of worker nodes based on collected worker node metrics and optimize the performance of the worker nodes and groups of worker nodes. Workload orchestration manager 218 utilizes distance function 222 to determine similarities and functional relationships between worker nodes and groups of worker nodes. Workload orchestration manager 218 utilizes grouping algorithm 224 to cluster worker nodes into groups of worker nodes based on values provided by objective function 220 and distance function 222. Grouping algorithm 224 may be, for example, a k-means clustering algorithm or the like.

Workload orchestration manager 218 manages workload orchestration environment 226. Workload orchestration environment 226 represents an identifier of the environment, such as, for example, a cloud environment, a data center, or the like, where workload orchestration manager 218 redistributes workloads between worker nodes to optimize performance. Workload orchestration environment 226 includes cluster of worker node groups 228. Cluster of worker node groups 228 comprises a plurality of different groups of worker nodes, such as worker node group 230. Worker node group 230 includes a set of worker nodes. In other words, a worker node group is equivalent to a set or worker nodes, and vice versa, as used throughout this application. Each worker node in the set of worker nodes (i.e., worker node group 230) executes one or more workloads. The set of worker nodes may include physical and/or virtual data processing machines. The workloads may include any type of data processing workload.

Workload orchestration manager 218 collects metrics 234 for each worker node in worker nodes 232. Metrics 234 may include, for example, processor utilization metrics, memory utilization metrics, storage utilization metrics, network utilization metrics, health index, and the like, corresponding to each worker node. Further, worker node group 230 may include hot region 236 and cold region 238 based on metrics 234 exceeding thresholds 240. Thresholds 240 include overutilization threshold 242 and underutilization threshold 244. If metrics 234 of a particular worker node exceed overutilization threshold 242, then workload orchestration manager may place that particular worker node in hot region 236. Similarly, if metrics 234 of a particular worker node exceed underutilization threshold 244, then workload orchestration manager may place that particular worker node in cold region 238.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In current cluster management, to increase workload capacity of a group of worker nodes in a cluster of worker node groups, a new node is added in the group. The newly created workload is scheduled on the newly added worker node. The workload keeps running on the same worker node. A system administrator has to manually balance workloads across all worker nodes in the group. In addition, workloads to be deleted from worker nodes need to be migrated by the system administrator to another worker node. A worker node that is to be updated is marked as un-schedulable so that no new workload is scheduled on that worker node. For major maintenance activity, the worker node can be drained out and all the workloads running on that worker node migrated to one or more other worker nodes in the group.

A cloud manager may provide user visibility, application-centric management (e.g., policies, deployments, health, and operations), and policy-based compliance across clouds and clusters of worker node groups. The cloud manager may provide control of the clusters of worker node groups in the workload orchestration environment. The cloud manager may ensure that a customer's cluster of worker node groups is secure, operating efficiently, and delivering service levels that applications expect. In addition, the cloud manager may deploy workloads on multiple groups of worker nodes. A user may view the workloads in a namespace in all development groups.

An issue with a single worker node group case is that when a group autoscaler adds new worker nodes to the group, the workload is not redistributed across the worker nodes of the group to balance resource utilization of the worker nodes. Similarly, in the case of maintenance, when a worker node is isolated for repair and then added back to the group, the workload is not getting rebalanced. An issue with deployment of workload across multiple worker node groups is that when the workload on a group of worker nodes is high (i.e., greater than a workload threshold level), then a system administrator has to manually migrate the workload to another group to balance the utilization of resources.

Thus, there is a need to detect and redistribute workload automatically and optimally amongst the worker nodes (i.e., existing and new), while ensuring that no sudden dip or drastic perturbation in the workload distribution occurs and while adhering to existing workload placement policies and workload affinities to particular worker nodes. Further, a need exists to optimize workload distribution using an objective function that takes into account a ratio of resource utilization to workload capacity and historical health characteristics of the worker nodes. The ratio of resource utilization to workload capacity ensures equitable distribution of consumption of compute, storage, and network resources, such as, for example, processor usage, memory usage, network usage, and the like. The historical health characteristics of the worker nodes may include, for example, repeated node failures, such as, service down, out of memory, and the like, and may trigger proactive workload migration from unhealthy worker nodes to healthy worker nodes in the same group.

An approach to the above issues includes defining upper and lower thresholds for resource utilization of the worker nodes in order to trigger workload redistribution. At regular intervals, collect resource utilization data from the worker nodes. If the average resource utilization of a worker node is above the upper threshold, then trigger workload redistribution. Select the worker nodes that are over-utilized. In addition, select the workloads in these over-utilized worker nodes for migration so that once these workloads are removed from the over-utilized worker nodes, the total resource utilization of these worker nodes will fall below the upper threshold. Delete the selected workloads from these over-utilized worker nodes. Allow a scheduling algorithm in the workload orchestration environment to place these selected workloads on less utilized worker nodes.

If the average resource utilization of a worker node is below the lower threshold, then again trigger workload redistribution. Select worker nodes that have higher utilization (i.e., not only over-utilized worker nodes). Select the workloads in these higher utilization worker nodes for migration so that once these selected workloads are added to the under-utilized worker nodes, the total resource utilization of these under-utilized worker nodes will raise above the lower threshold. Delete the selected workloads from the higher utilization worker nodes. Allow the scheduling algorithm in the workload orchestration environment to place these selected workloads on the less utilized worker nodes. Wait until the workload orchestration environment stabilizes (e.g., for a predefined interval), before triggering any more workload redistributions.

However, disadvantages to this approach may be that the thresholds are static in nature and do not take into account the overall utilization of all worker nodes in the group at any one time. Also, this approach may require many iterations to normalize and redistribute the workload. Further, this approach may not guarantee that the workload orchestration environment will reach local or global optimal performance defined by the objective function.

As a result, illustrative embodiments to address the above issues define an objective function, define a distance function, detect sub-optimal workload distribution, identify hot regions in a group of worker nodes, perform workload redistribution until the group reaches the nearest local optima or global optima based on the defined objective and distance functions, and automatically add a new worker node to the group upon detecting an unhealthy worker node in the group or detecting a sudden increase in the workload of the group.

The objective function optimizes the overall workload performance of a group of worker nodes in the cluster of worker node groups. In other words, the objective function measures the workload performance of the group of worker nodes and optimizes the performance. For example, the objective function measures percentage of processor utilization for all worker nodes in the group, percentage of memory utilization for all worker nodes in the group, percentage of network utilization for each worker nodes in the group tagged as "inout", and a health-index for all worker nodes in the group, which is dynamically computed based on age, historical failure trends, and the like of each worker node in the group. Based on the measurements, the objective function then optimizes equitable percentage utilization of the processor and memory across all the worker nodes in the group, optimizes equitable percentage utilization of the network across worker nodes tagged as 'inout', and consolidates the workload on worker nodes in the group with a health-index greater than a defined health threshold level, such as, for example, eight on the scale of one to ten. In an alternative embodiment, the objective function uses the energy consumed by each worker node in the group as the measure and then optimizes the total energy consumed by all the worker nodes in the group.

Optimization actions for the objective function may include, for example, removing one or more workloads from a worker node to reduce percentage of processor and memory utilization of that individual worker node, consolidating workloads to a fewer number of worker nodes in the group, and hibernating remaining worker nodes of the group or tagging them as "unavailable" to reduce overall energy consumption of the group. Illustrative embodiments may utilize two types of objective functions, a local objective function and a global objective function. The local objective function works at the group level. This local objective function optimizes a single group of worker nodes within a cluster of worker node groups. The measure, detect, and optimize of the local objective function occurs in a localized manner, which requires equitable redistribution of workload by temporally detecting local optima at the group level. This measure, detect, and optimize helps maintain worker node affinity of the workloads. Further, this measure, detect, and optimize is triggered after a predefined time interval, such as, for example, an hour, six hours, twelve hours, one day, three days, one week, two weeks, one month, or the like. The global objective function works at the global level across all groups of worker nodes in the cluster. The measure, detect, and optimize occurs in a globalized manner, which requires the workload to be consolidated into a fewer number of worker nodes by detecting spatially global optima across multiple worker node groups in the cluster. This measure, detect, and optimize is triggered if a new worker node has been added or deleted from the cluster of worker node groups.

In addition, the object function may be further divided into sub-functions that perform a single atomic measure, detect, and optimize action, which is relevant to a single group of worker nodes. Atomic functions may include, for example, tag name-based atomic functions, network-aware atomic functions, and the like. Tag name-based atomic functions perform actions based on the tag name given to workloads and worker nodes. For example, equitable redistribution of a workload tagged "web" across worker nodes tagged "inout" can be translated to an atomic objective function that is relevant for the group of worker nodes with workloads tagged as "web" and not for the other groups of worker nodes in the cluster. The network-aware atomic functions perform actions on a workload on different worker nodes that frequently interact with each other and can be put on single worker node.

The distance-function detects similarities between worker nodes based on, for example, functional relationships between workloads running on the worker nodes, which may be identified using workload namespaces, percentage utilization of resources, such as processor, memory, storage, network, and the like, by the workloads, impact of optimization actions taken to achieve the objective function, higher-level abstractions or variables, such as number of namespaces, number of workloads, number of services, service response-times, and the like. Illustrative embodiments calculate the distance of worker nodes with respect to training worker node metrics data or average/mean worker node metrics data collected within the cluster of worker node groups corresponding to the workload orchestration environment. For example, if the average worker node memory utilization of a group is 1 GB and a particular worker node in the group is utilizing 2 GBs of memory, then illustrative embodiments calculate the distance of that particular worker node to be 2−1=1. It should be noted that illustrative embodiments collect two type of the worker node metrics. The first type is numerical worker node metrics, such as amount of memory, processor, storage, and network utilization, response times, and the like. The second type is categorical worker node metrics, such as namespaces, tag names, service names, and the like. The distance function converts categorical worker node metrics into numerical values to calculate the distance for a worker node.

Illustrative embodiments may utilize a model such as the training or average worker node dataset that is equal to $T(X1, X2, \ldots Xn)$, where Xi is the average metrics values for worker nodes in a group and the dataset for a particular worker node that is equal to $N(Y1, Y2, \ldots Yn)$, where Yi is the worker node's metrics value. The distance of the worker node "N" is defined as:

$$DIST(N) = \sqrt{\frac{\sum_{i=1}^{n}(Xi - Yi)^2}{n}}, \quad (1)$$

where "n" is equal to the number of worker nodes in the group. In a later step, illustrative embodiments use the distance function to dynamically cluster worker node groups in the workload orchestration environment.

Illustrative embodiments detect sub-optimal workload distribution in real time as time progress. For example, in the workload orchestration environment several changes regarding worker nodes can be expected, such as removal of existing worker nodes, addition of new worker nodes, health index deterioration of some worker nodes, and the like. Furthermore, several changes regarding workloads also can be expected, such as addition of new workloads (e.g., deployments, replica sets, workloads, and the like), removal of some workloads from the cluster, and the like. All of the changes can lead to uneven or sub-optimal distribution of workloads across the worker nodes.

Illustrative embodiments utilize a grouping algorithm to dynamically group worker nodes based on distance function values. The grouping algorithm may be, for example, a k-means clustering algorithm. The grouping algorithm can place a worker node in one or more worker node groups based on the distance of the worker node from a centroid of a group of worker nodes. The grouping algorithm tries to assign each worker node within the cluster of worker node groups to its nearest group of worker nodes. The grouping algorithm repeats this process until all the worker nodes are properly assigned to any one of the worker node groups with a minimum possible distance.

Illustrative embodiments detect local sub-optimal conditions at the group level based on thresholds extracted from: 1) historical trends in the atomic objective function for localized optimization used by the worker nodes in the group; or 2) historical trends in the global objective function for globalized optimization. In this step, illustrative embodiments utilize the objective function and distance function to determine the sub-optimal condition in the group while taking into account the dynamic nature of the overall workload orchestration environment.

Illustrative embodiments utilize the objective function to calculate the energy consumption of a given worker node based on, for example, processor usage, memory usage, storage usage, network usage, and health index of that particular worker node. The objective function identifies suboptimal over resource consumption within the group by updating an "over usage" tag of a worker node to true when that particular worker node is consuming relatively more energy than other worker nodes in the group. In this case, the difference between the worker node's energy consumption and average energy consumption of the group of worker nodes is the over usage delta. Similarly, the objective function identifies the suboptimal under resource consumption within the group by updating an "under usage" tag of a worker node to true when that particular worker node is consuming relatively less energy than other worker nodes in the group. In this case, the difference between the worker node's energy consumption and average energy consumption of the group of worker nodes is the under usage delta.

Illustrative embodiments further detect global sub-optimal conditions based on a threshold extracted spatially from multiple worker node groups and worker nodes in the groups using the objective function discreetly, at a lower frequency, thereby requiring less inter-node communication. The distance function determines the distance of each group's mean from the global centroid. If the distance is more than the threshold, then illustrative embodiments detect the global sub-optimal region. Advantages of this process are minimal or optimal data collection and automatic isolation of potential hotspots.

A hotspot in a group is a worker node or workload that significantly contributes to the overall group sub-optimality. A hot region is a set of one or more worker nodes with an over usage delta. A cold region is a set of one or more worker nodes with an under usage delta.

Illustrative embodiments perform workload redistribution to ensure that hot and cold regions are normalized. This normalization is achieved by selecting workloads from the hot region and relocating them in the cold region. Illustrative embodiments perform this normalization process iteratively while ensuring that the constraints, such as, for example, workload placement policy, workload node affinity, and the like, are not broken.

Moreover, illustrative embodiments remove unhealthy worker nodes from the worker node groups. If any worker node becomes an unhealthy worker node, illustrative embodiments remove or make un-schedulable that particular worker node. Illustrative embodiments add a new worker node or a spare worker node to accommodate the set of one or more workloads from the removed unhealthy worker node. This prevents downtime of the service and meets the service level agreement. Illustrative embodiments utilize the objective function to determine the health status of a worker node. The objective function returns two values, the energy consumption and health status (e.g., ready, warn, not ready, critical, and the like) of the worker node. If the worker node is not ready or in a critical status, then illustrative embodiments try to add a new worker node to the group based on both a "new node auto add" flag and a "new node available" flag being set to true. The new node auto add flag is a configurable flag that determines whether a new worker node should be automatically added to the group when an unhealthy node is detected. The new node available flag is a configurable flag that indicates whether a new worker node is currently available to be added to the group when an unhealthy node is detected.

Thus, illustrative embodiments provide one or more technical solutions that overcome a technical problem with redistributing data processing workloads across worker nodes to optimize data processing environment performance. As a result, these one or more technical solutions provide a technical effect and practical application in the field of data processing optimization.

With reference now to FIG. 3, a diagram illustrating an example of a workload orchestration environment is depicted in accordance with an illustrative embodiment. Workload orchestration environment 300 may be implemented in a network of data processing systems, such as network data processing system 100 in FIG. 1. Workload orchestration environment 300 is a system of hardware and software components for rescheduling workloads across worker nodes of a workload orchestration environment to redistribute the workloads based on policy.

In this example, workload orchestration environment 300 comprises cluster of worker node groups 302. Cluster of worker node groups 302 includes worker node group 304. In this example, worker node group 304 includes master node 306, worker node 1 308, worker node 2 310, and worker node 3 312. However, it should be noted that worker node group 304 may include any number of worker nodes. In addition, master node 306 is the initial entry and management point for all workload operations to be executed in worker node group 304.

In this example, worker node 1 308 runs workload 314 and workload 316, worker node 2 310 runs workload 318 and workload 320, and worker node 3 312 runs workload 322 and workload 324. However, it should be noted that worker node 1 308, worker node 2 310, and worker node 3 312 may run any number and type of workloads. Further, worker node 1 308, worker node 2 310, and worker node 3 312 include node metric exporter 326, node metric exporter 328, and node metric exporter 330, respectively.

Metrics collector 332 collects metrics within worker node group 304. Node metric exporter 326, node metric exporter 328, and node metric exporter 330 export the different metrics, which may include, for example, errors, memory usage, processor usage, network usage, storage usage, and the like, corresponding to worker node 1 308, worker node 2 310, and worker node 3 312, respectively. In other words, a node metric exporter module runs on all worker nodes within a group of worker nodes. Metrics collector 332 continuously collects the metrics from all the node metric exporter modules within worker node group 304. It should be noted that metrics collector 332 may run on any worker node within worker node group 304.

Workload reschedule 334 fetches new metrics, error messages, and the like from metrics collector 332 at regular intervals. Workload reschedule 334 also determines unhealthy worker nodes within worker node group 304 and migrates the workloads of the unhealthy worker nodes to healthy worker nodes within worker node group 304. Workload reschedule 334 utilizes an objective function to poll metrics collector 332 to get the latest metrics (e.g., processor usage, memory usage, error frequency, and the like). The objective function calculates the energy consumption of worker nodes based on the received metrics for all the worker nodes.

Workload reschedule 334 then determines the hot and cold regions within worker node group 304. It should be noted that illustrative embodiments deploy workload reschedule 334 within worker node group 304 so that workload reschedule 334 can retrieve the information on all workloads running within worker node group 304. Workload reschedule 334 updates the workload deployment template, which may include workload placement policies and workload node affinities, for workload migration. Furthermore, workload reschedule 334 may scale down a workload prior to migration and then scale up the workload after migration.

This scaling up and down of workloads allows workload reschedule 334 to migrate workloads from the hot region to the cold region of worker node group 304.

Figure 4A:
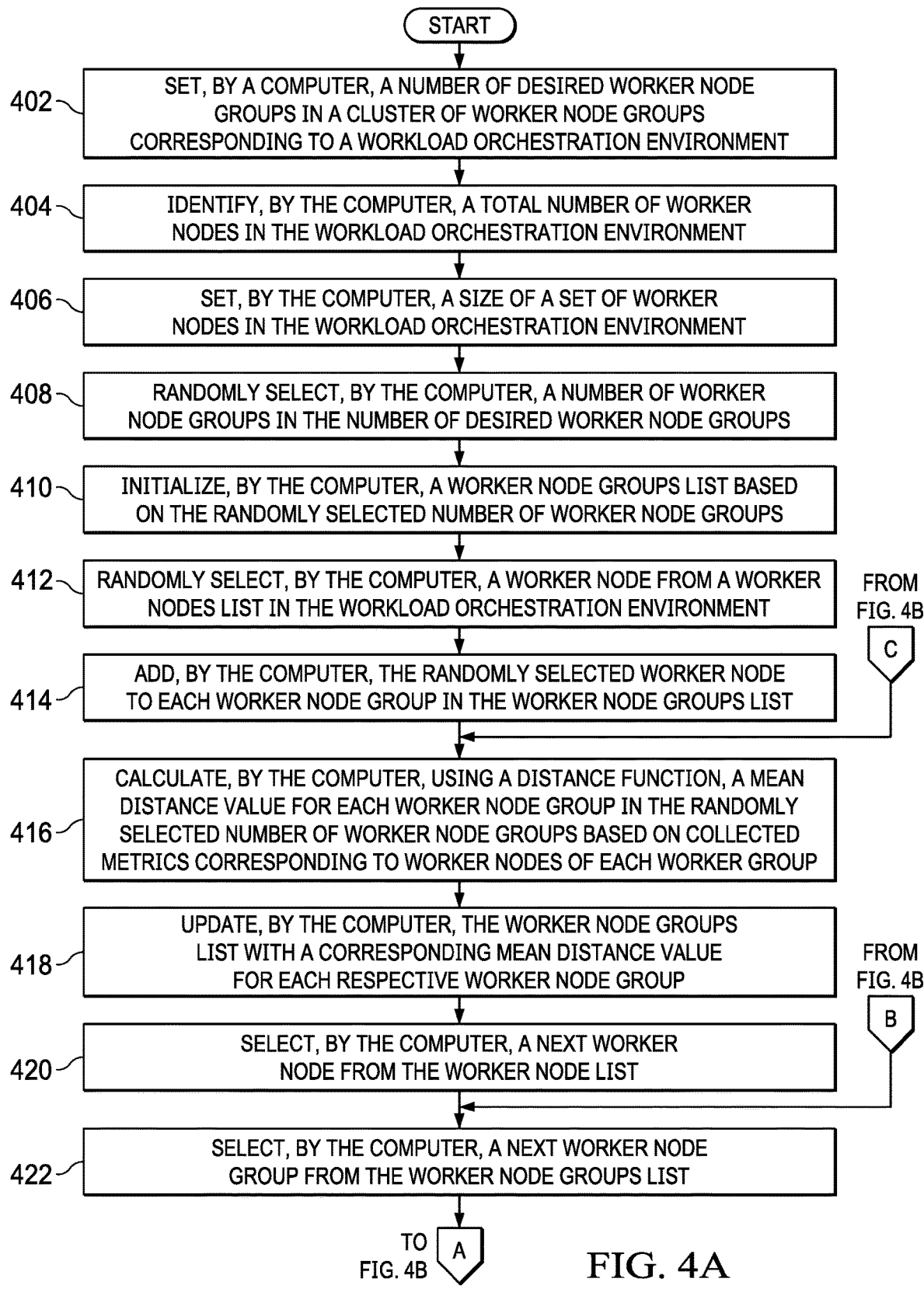
FIGS. 4A-4B are a flowchart illustrating a process for grouping worker nodes in a cluster in accordance with an illustrative embodiment.
Figure 4B:
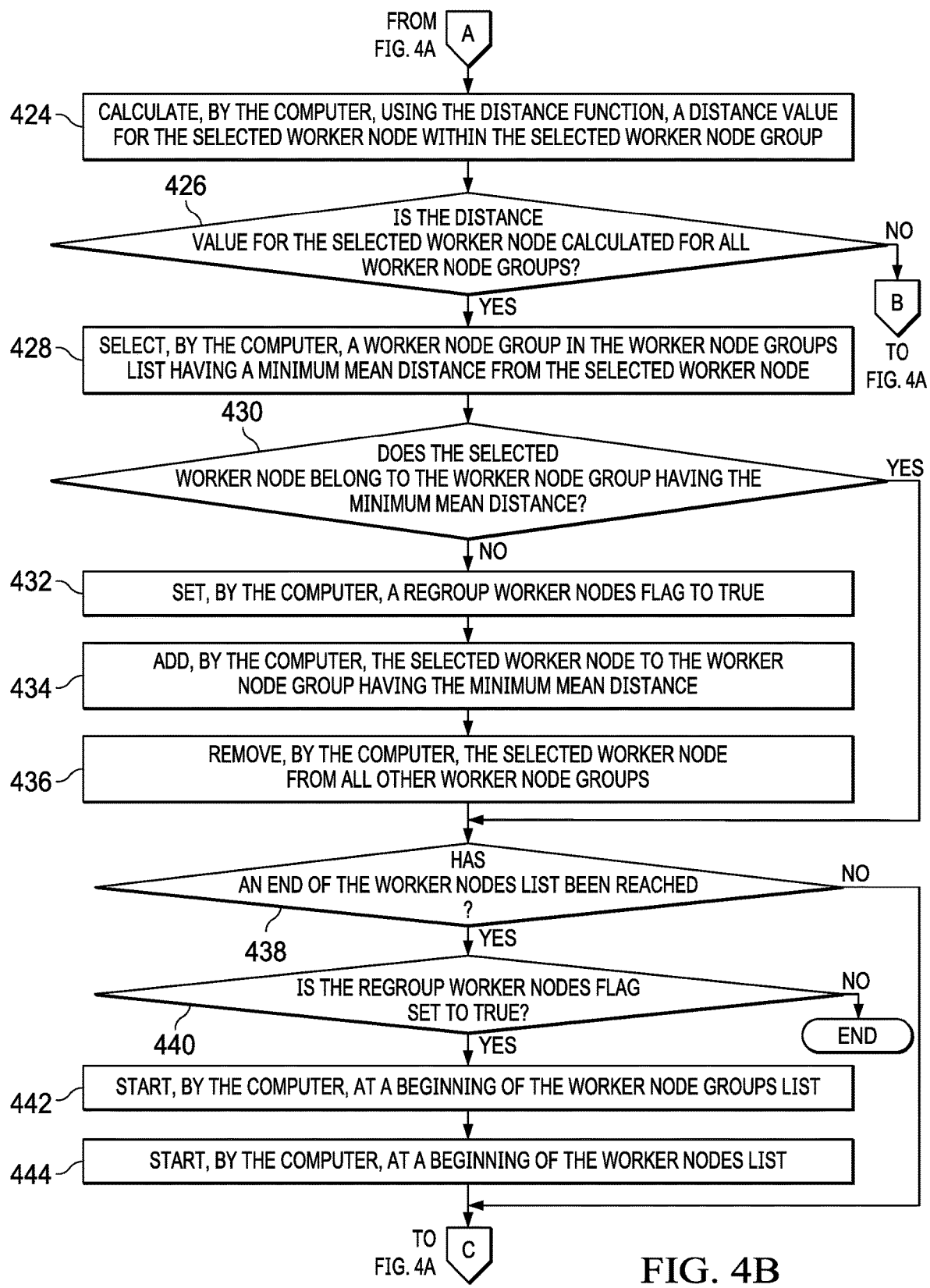

With reference now to FIGS. 4A-4B, a flowchart illustrating a process for grouping worker nodes in a cluster is shown in accordance with an illustrative embodiment. The process shown in FIGS. 4A-4B may be implemented in a computer, such as, for example, workload orchestration server 104 in FIG. 1 or data processing system 200 in FIG. 2.

The process begins when the computer sets a number of desired worker node groups in a cluster of worker node groups corresponding to a workload orchestration environment (step 402). In addition, the computer identifies a total number of worker nodes in the workload orchestration environment (step 404). Further, the computer sets a size of a set of worker nodes in the workload orchestration environment (step 406).

The computer randomly selects a number of worker node groups in the number of desired worker node groups (step 408). The computer initializes a worker node groups list based on the randomly selected n umber of worker node groups (step 410). The computer randomly selects a worker node from a worker nodes list in the workload orchestration environment (step 412). The computer adds the randomly selected worker node to each worker node group in the worker node groups list (step 414).

The computer, using a distance function, calculates a mean distance value for each worker node group in the randomly selected number of worker node groups based on collected metrics corresponding to worker nodes of each worker node group (step 416). The computer updates the worker node groups list with a corresponding mean distance value for each respective worker node group (step 418). The computer selects a next worker node from the worker nodes list (step 420). The computer also selects a next worker node group from the worker node groups list (step 422). The computer, using the distance function, calculates a distance value for the selected next worker node within the selected next worker node group (step 424).

The computer makes a determination as to whether the distance value for the selected worker node is calculated for all worker node groups in the worker node groups list (step 426). If the computer determines that the distance value for the selected worker node is not calculated for all worker node groups, no output of step 426, then the process returns to step 422 where the computer selects a next worker node group from the worker node groups list. If the computer determines that the distance value for the selected worker node is calculated for all worker node groups, yes output of step 426, then the computer selects a worker node group in the worker node groups list having a minimum mean distance from the selected worker node (step 428).

The computer makes a determination as to whether the selected worker node belongs to the worker node group having the minimum mean distance (step 430). If the computer determines that the selected worker node does belong to the worker node group having the minimum mean distance, yes output of step 430, then the process proceeds to step 438. If the computer determines that the selected worker node does not belong to the worker node group having the minimum mean distance, no output of step 430, then the computer sets a regroup worker nodes flag to true (step 432).

Further, the computer adds the selected worker node to the selected worker node group having the minimum mean distance (step 434). Furthermore, the computer removes the selected worker node from all other worker node groups (step 436). Moreover, the computer makes a determination as to whether an end of the worker nodes list has been reached (step 438).

If the computer determines that the end of the worker nodes list has not been reached, no output of step 438, then the process returns to step 416 where the computer recalculates the mean distance value for each worker node group. If the computer determines that the end of the worker nodes list has been reached, yes output of step 438, then the computer makes a determination as to whether the regroup worker nodes flag is set to true (step 440). If the computer determines that the regroup worker nodes flag is not set to true, no output of step 440, then the process terminates thereafter. If the computer determines that the regroup worker nodes flag is set to true, yes output of step 440, then the computer starts at a beginning of the worker node list (step 442) and starts at a beginning of the worker nodes list (step 444). Thereafter, the process returns to step 416 where the computer recalculates the mean distance value for each worker node group.

Figure 5A:
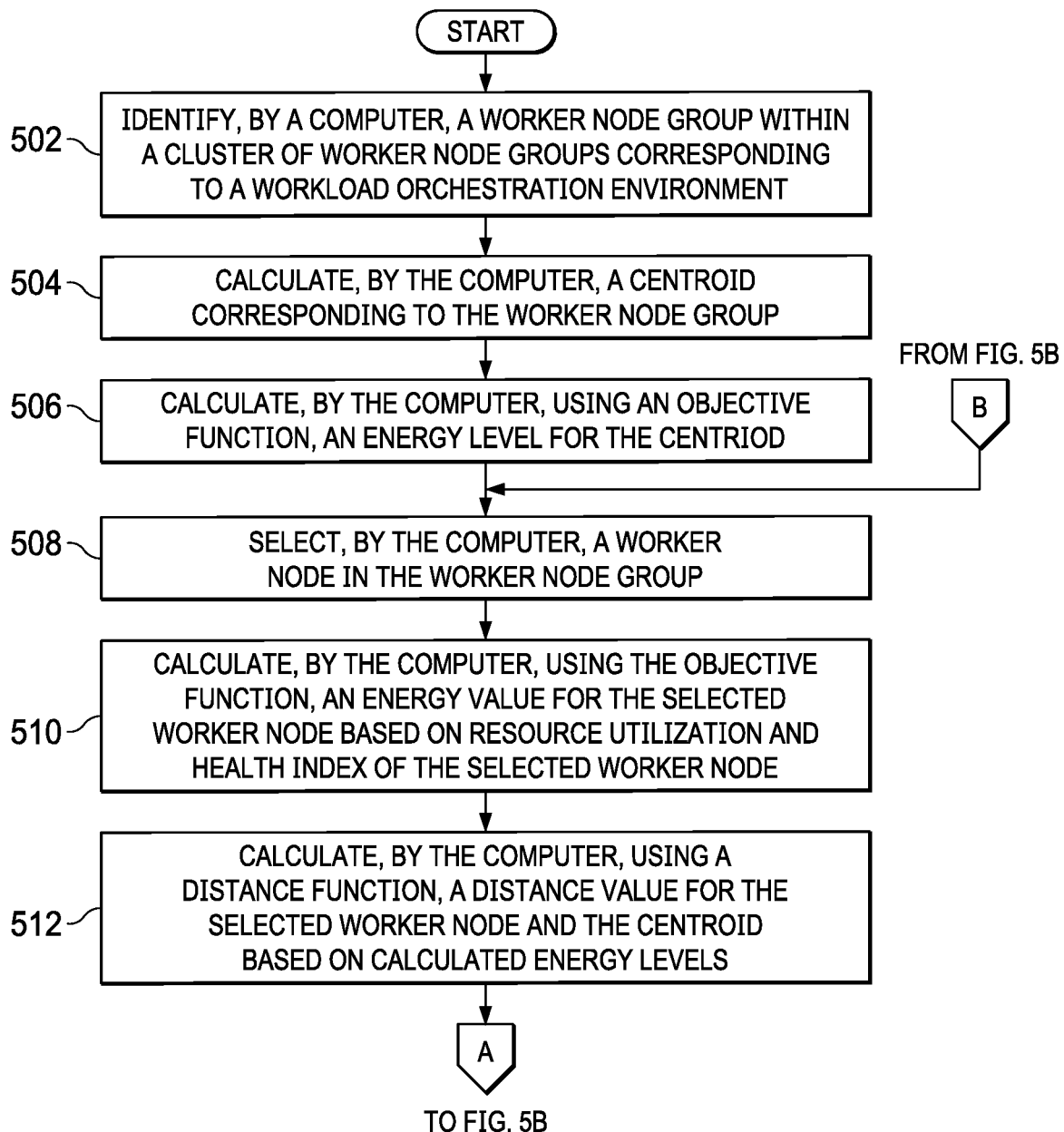
FIGS. 5A-5B are a flowchart illustrating a process for detecting sub-optimal workload distribution at a local level in accordance with an illustrative embodiment.
Figure 5B:
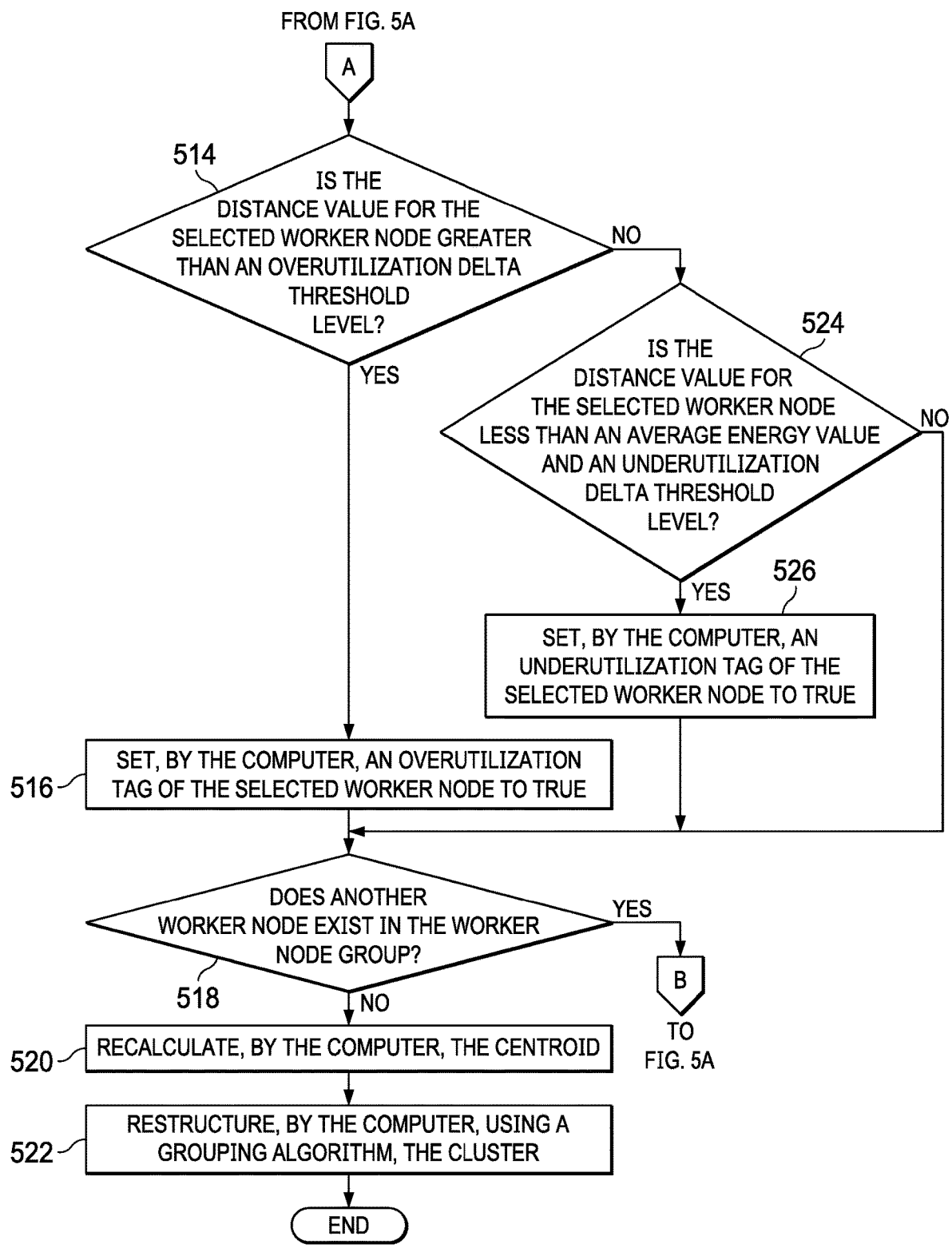

With reference now to FIGS. 5A-5B, a flowchart illustrating a process for detecting sub-optimal workload distribution at a local level is shown in accordance with an illustrative embodiment. The process shown in FIGS. 5A-5B may be implemented in a computer, such as, for example, workload orchestration server 104 in FIG. 1 or data processing system 200 in FIG. 2. The process for grouping creates multiple groups of worker nodes. This process detects sub-optimal conditions in a worker node group, which is passed as a parameter.

The process begins when the computer identifies a worker node group within a cluster of worker node groups corresponding to a workload orchestration environment (step 502). The computer also calculates a centroid corresponding to the set of worker nodes (step 504). In addition, the computer, using an objective function, calculates an energy level for the centroid (step 506).

The computer selects a worker node in the worker node group (step 508). The computer, using the objective function, calculates an energy value for the selected worker node based on resource utilization and health index of the selected worker node (step 510). Further, the computer, using a distance function, calculates a distance value for the selected worker node and the centroid based on their calculated energy levels (step 512). Furthermore, the computer makes a determination as to whether the distance value for the selected worker node is greater than an overutilization delta threshold level (step 514).

If the computer determines that the distance value for the selected worker node is greater than the overutilization delta threshold level, yes output of step 514, then the computer sets an overutilization tag of the selected worker node to true (step 516). Afterward, the computer makes a determination as to whether another worker node exists in the worker node group (step 518). If the computer determines that another worker node does exist in the worker node group, yes output of step 518, then the process returns to step 508 where the computer selects another worker node in the worker node group.

If the computer determines that another worker node does not exist in the worker node group, no output of step 518, then the computer recalculates the centroid corresponding to the worker node group (step 520). Moreover, the computer, using a grouping algorithm, restructures the cluster of worker node groups in the workload orchestration environment (step 522). Thereafter, the process terminates.

Returning again to step 514, if the computer determines that the distance value for the selected worker node is not greater than the overutilization delta threshold level, no output of step 514, then the computer makes a determination as to whether the distance value for the selected worker node is less than an average energy value and an underutilization delta threshold level (step 524). If the computer determines that the distance value for the selected worker node is less than the average energy value and the underutilization delta threshold level, yes output of step 524, then the computer set an underutilization tag of the selected worker node to true (step 526). Thereafter, the process returns to step 518 where the computer determines whether another worker node exists in the worker node group. If the computer determines that the distance value for the selected worker node is not less than the average energy value and the underutilization delta threshold level, no output of step 524, then the process returns to step 518 where the computer determines whether another worker node exists in the worker node group.

Figure 6:
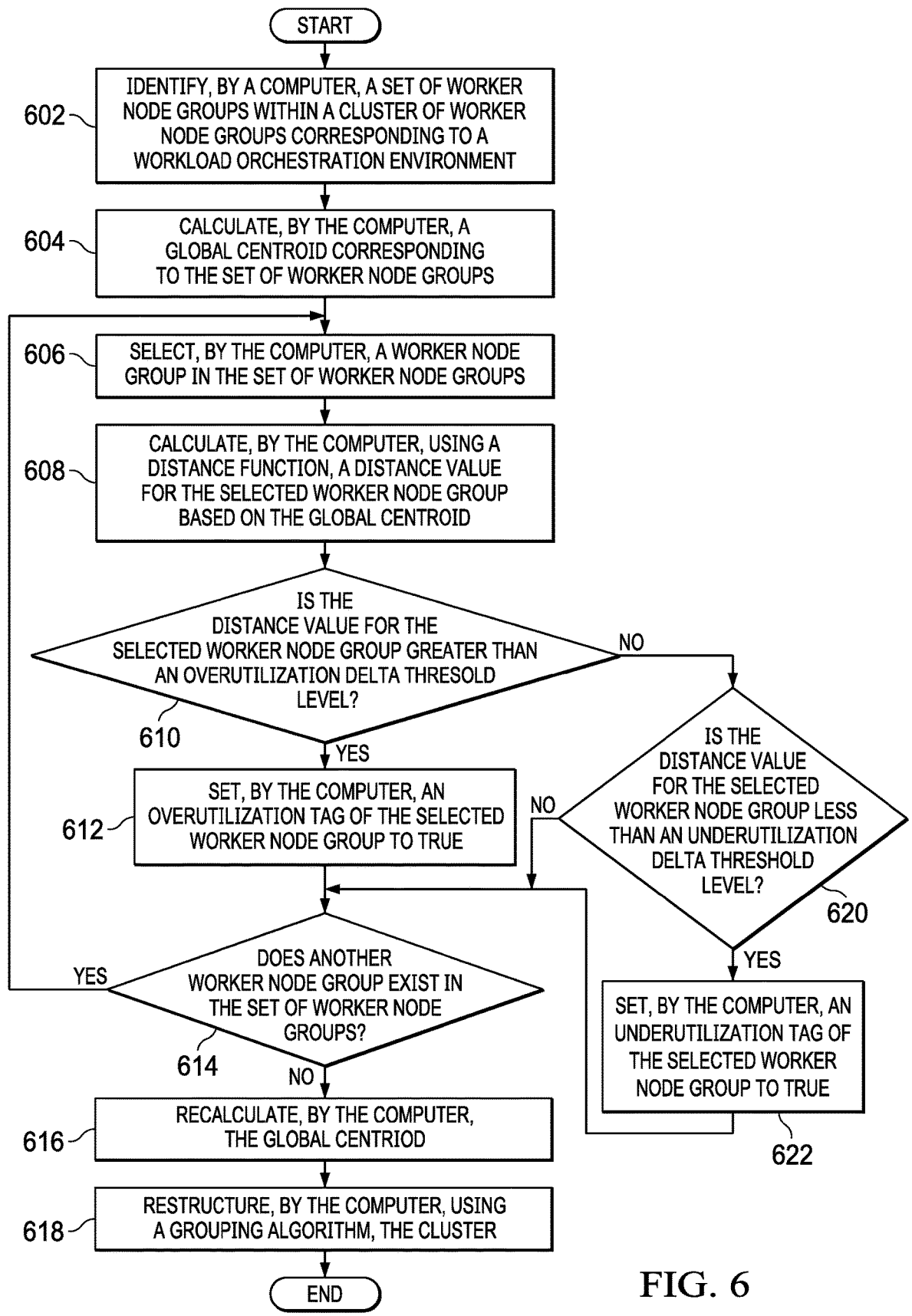
FIG. 6 is a flowchart illustrating a process for detecting sub-optimal workload distribution at a global level in accordance with an illustrative embodiment.

With reference now to FIG. 6, a flowchart illustrating a process for detecting sub-optimal workload distribution at a global level is shown in accordance with an illustrative embodiment. The process shown in FIG. 6 may be implemented in a computer, such as, for example, workload orchestration server 104 in FIG. 1 or data processing system 200 in FIG. 2.

The process begins when the computer identifies a set of worker node groups within a cluster of worker node groups corresponding to a workload orchestration environment (step 602). The computer calculates a global centroid corresponding to the set of worker node groups (step 604). In addition, the computer selects a worker node group in the set of worker node groups (step 606).

The computer, using a distance function, calculates a distance value for the selected worker node group based on the global centroid (step 608). Afterward, the computer makes a determination as to whether the distance value for the selected worker node group is greater than an overutilization delta threshold level (step 610). If the computer determines that the distance value for the selected worker node group is greater than the overutilization delta threshold level, yes output of step 610, then the computer sets an overutilization tag of the selected worker node group to true (step 612).

Subsequently, the computer makes a determination as to whether another worker node group exists in the set of worker node groups (step 614). If the computer determines that another worker node group does exist in the set of worker node groups, yes output of step 614, then the process returns to step 606 where the computer selects another worker node group in the set. If the computer determines that another worker node group does not exist in the set of worker node groups, no output of step 614, then the computer recalculates the global centroid corresponding to the set of worker node groups (step 616). Further, the computer, using a grouping algorithm, restructures the cluster of worker node groups (step 618).

Returning again to step 610, if the computer determines that the distance value for the selected worker node group is not greater than the overutilization delta threshold level, no output of step 610, then the computer makes a determination as to whether the distance value for the selected worker node group is less than an underutilization delta threshold level (step 620). If the computer determines that the distance value for the selected worker node group is less than the underutilization delta threshold level, yes output of step 620, then the computer sets an underutilization tag of the selected worker node group to true (step 622). Thereafter, the process returns to step 614 where the computer determines whether another worker node group exists in the set. If the computer determines that the distance value for the selected worker node group is not less than the underutilization delta threshold level, no output of step 620, then the returns to step 614 where the computer determines whether another worker node group exists in the set.

Figure 7:
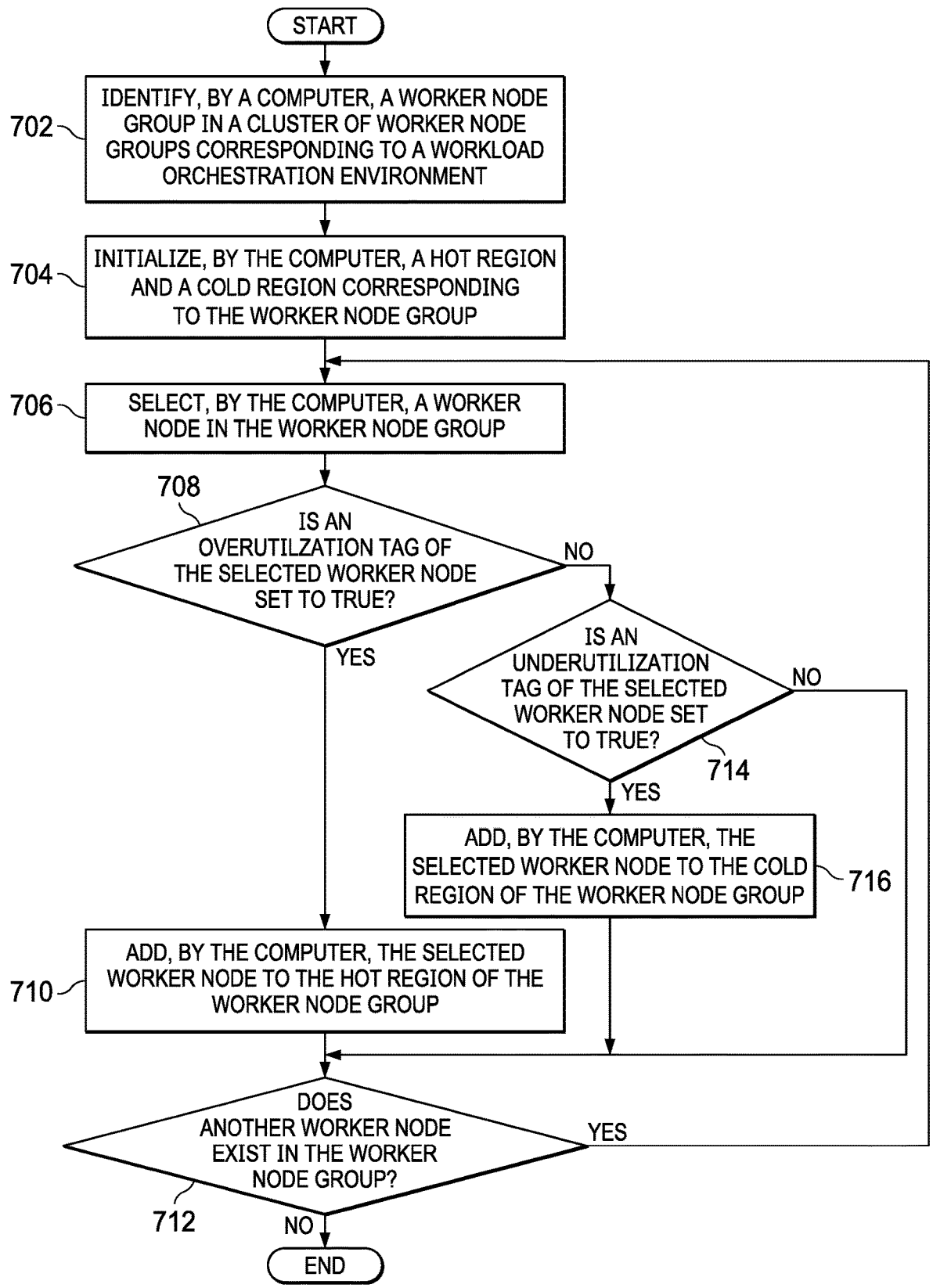
FIG. 7 is a flowchart illustrating a process for identifying workload hotspots in a group of worker nodes in accordance with an illustrative embodiment.

With reference now to FIG. 7, a flowchart illustrating a process for identifying workload hotspots in a group of worker nodes is shown in accordance with an illustrative embodiment. The process shown in FIG. 7 may be implemented in a computer, such as, for example, workload orchestration server 104 in FIG. 1 or data processing system 200 in FIG. 2.

The process begins when the computer identifies a worker node group in a cluster of worker node groups corresponding to a workload orchestration environment (step 702). The computer initializes a hot region and a cold region corresponding to the worker node group (step 704). In addition, the computer selects a worker node in the worker node group (step 706).

Subsequently, the computer makes a determination as to whether an overutilization tag of the selected worker node is set to true (step 708). If the computer determines that the overutilization tag of the selected worker node is set to true, yes output of step 708, then the computer adds the selected worker node to the hot region of the worker node group (step 710). Afterward, the computer makes a determination as to whether another worker node exists in the worker node group (step 712). If the computer determines that another worker node does exist in the worker node group, yes output of step 712, then the process returns to step 706 where the computer selects another worker node in the group. If the computer determines that another worker node does not exist in the worker node group, no output of step 712, then the process terminates thereafter.

Returning again to step 708, if the computer determines that the overutilization tag of the selected worker node is not set to true, no output of step 708, then the computer makes a determination as to whether an underutilization tag of the selected worker node is set to true (step 714). If the computer determines that the underutilization tag of the selected worker node is set to true, yes output of step 714, then the computer adds the selected worker node to the cold region of the worker node group (step 716). Thereafter, the process returns to step 712 where the computer determines whether another worker node exists in the group. If the computer determines that the underutilization tag of the selected worker node is not set to true, no output of step 714, then the process returns to step 712 where the computer determines whether another worker node exists in the group.

Figure 8:
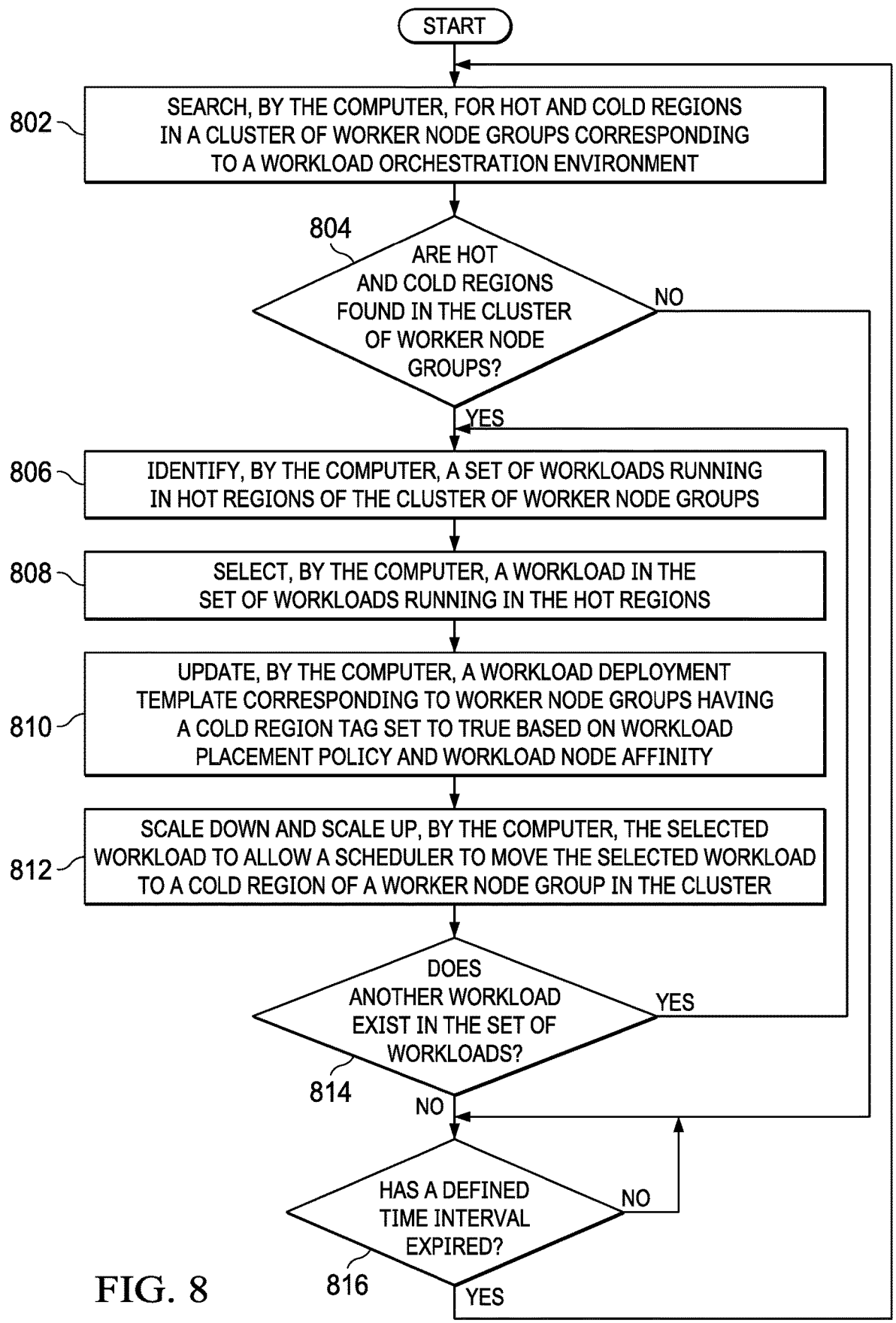
FIG. 8 is a flowchart illustrating a process for redistributing workload in accordance with an illustrative embodiment.

With reference now to FIG. 8, a flowchart illustrating a process for redistributing workload is shown in accordance with an illustrative embodiment. The process shown in FIG. 8 may be implemented in a computer, such as, for example, workload orchestration server 104 in FIG. 1 or data processing system 200 in FIG. 2.

The process begins when the computer searches for hot and cold regions in a cluster of worker node groups corresponding to a workload orchestration environment (step 802). Afterward, the computer makes a determination as to whether hot and cold regions were found in the cluster of worker node groups (step 804). If the computer determines that no hot and cold regions were found in the cluster of worker node groups, no output of step 804, then the process proceeds to step 818. If the computer determines that hot and cold regions were found in the cluster of worker node groups, yes output of step 804, then the computer identifies a set of workloads running in hot regions of the cluster of worker node groups (step 806).

Further, the computer selects a workload in the set of workloads running in the hot regions (step 808). Furthermore, the computer updates a workload deployment template corresponding to worker node groups having a cold region tag set to true based on workload placement policy and workload node affinity (step 810). Moreover, the computer scales down and scales up the selected workload to allow a scheduler to move the selected workload to a cold region of a worker node group in the cluster (step 812).

The computer also makes a determination as to whether another workload exists in the set of workloads (step 814). If the computer determines that another workload does exist in the set of workloads, yes output of step 814, then the process returns to step 808 where the computer selects another workload in the set. If the computer determines that another workload does not exist in the set of workloads, no output of step 814, then the computer makes a determination as to whether a defined time interval has expired (step 816). If the computer determines that the defined time interval has not expired, no output of step 816, then the process returns to step 816 where the computer waits for the defined time interval to expire. If the computer determines that the defined time interval has expired, yes output of step 816, then the process returns to step 802 where the computer again searches for hot and cold regions in the cluster.

Figure 9:
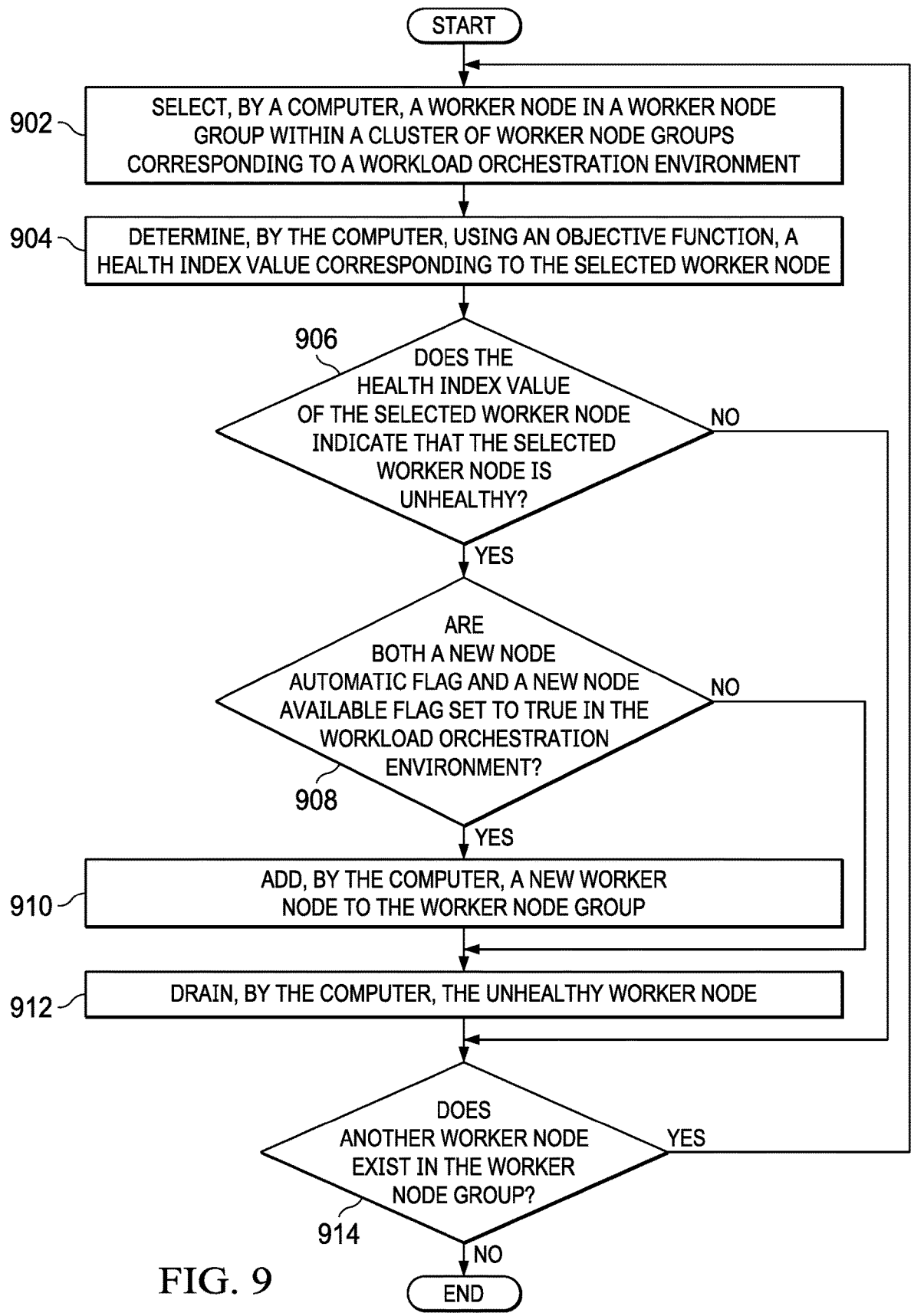
FIG. 9 is a flowchart illustrating a process for detecting unhealthy worker nodes in accordance with an illustrative embodiment.

With reference now to FIG. 9, a flowchart illustrating a process for detecting unhealthy worker nodes is shown in accordance with an illustrative embodiment. The process shown in FIG. 9 may be implemented in a computer, such as, for example, workload orchestration server 104 in FIG. 1 or data processing system 200 in FIG. 2.

The process begins when the computer selects a worker node in a worker node group within a cluster of worker node groups corresponding to a workload orchestration environment (step 902). The computer, using an objective function, determines a health index value corresponding to the selected worker node (step 904). Subsequently, the computer makes a determination as to whether the health index value of the selected worker node indicates that the selected worker node is unhealthy (step 906).

If the computer determines that the health index value of the selected worker node indicates the selected worker node is healthy, no output of step 906, then the process proceeds to step 914. If the computer determines that the health index value of the selected worker node indicates the selected worker node is unhealthy, yes output of step 906, then the computer makes a determination as to whether both a new node automatic flag and a new node available flag are set to true in the workload orchestration environment (step 908). It should be noted that the new node automatic flag and the new node available flag are global flags, which may be set by the system administrator, in the workload orchestration environment. If the computer determines that both the new node automatic flag and the new node available flag are not set to true, no output of step 908, then the process proceeds to step 912.

If the computer determines that both the new node automatic flag and the new node available flag are set to true, yes output of step 908, then the computer adds a new worker node to the worker node group (step 910). Further, the computer drains the unhealthy worker node (step 912). Furthermore, the computer makes a determination as to whether another worker node exists in the worker node group (step 914). If the computer determines that another worker node does exist in the worker node group, yes output of step 914, then the process returns to step 902 where the computer selects another worker node in the group. If the computer determines that another worker node does not exist in the worker node group, no output of step 914, then the process terminates thereafter.

Figure 10:
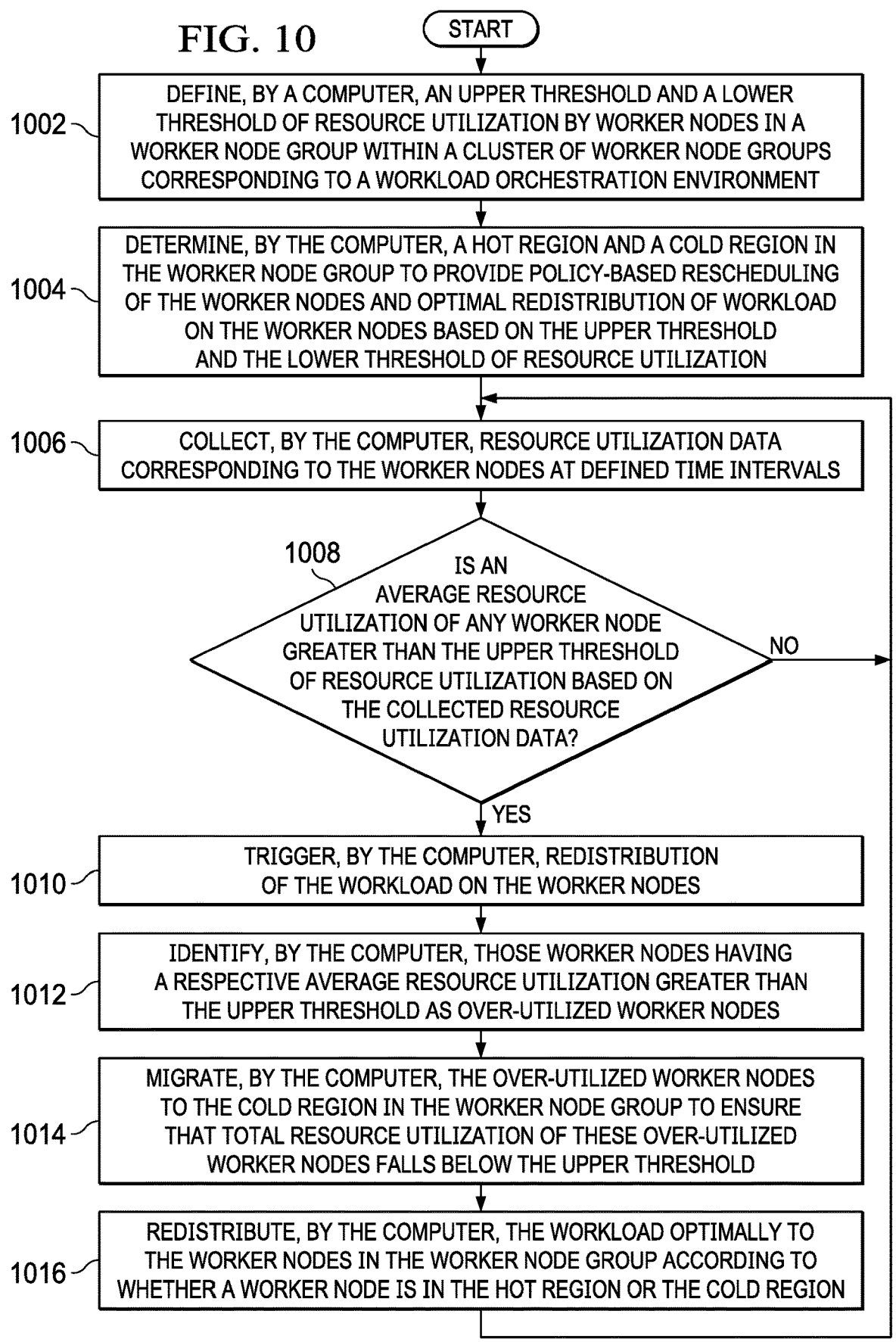
FIG. 10 is a flowchart illustrating a process for redistributing workload in accordance with an illustrative embodiment.

With reference now to FIG. 10, a flowchart illustrating a process for redistributing workload is shown in accordance with an illustrative embodiment. The process shown in FIG. 10 may be implemented in a computer, such as, for example, workload orchestration server 104 in FIG. 1 or data processing system 200 in FIG. 2.

The process begins when the computer defines an upper threshold and a lower threshold of resource utilization by worker nodes in a worker node group within a cluster of worker node groups corresponding to a workload orchestration environment (step 1002). In addition, the computer determines a hot region and a cold region in the worker node group to provide policy-based rescheduling of the worker nodes and optimal redistribution of workload on the worker nodes based on the upper threshold and the lower threshold of resource utilization (step 1004). Moreover, the computer collects resource utilization data corresponding to the worker nodes at defined time intervals (step 1006).

The computer makes a determination as to whether an average resource utilization of any worker node is greater than the upper threshold of resource utilization based on the collected resource utilization data (step 1008). If the computer determines that the average resource utilization of any worker node is not greater than the upper threshold of resource utilization based on the collected resource utilization data, no output of step 1008, then the process returns to step 1006 where the computer continues to collect resource utilization data at the defined time intervals. If the computer determines that the average resource utilization of any worker node is greater than the upper threshold of resource utilization based on the collected resource utilization data, yes output of step 1008, then the computer triggers redistribution of the workload on the worker nodes (step 1010).

The computer identifies those worker nodes having a respective average resource utilization greater than the upper threshold as over-utilized worker nodes (step 1012). The computer migrates the over-utilized worker nodes to the cold region in the worker node group to ensure that total resource utilization of these over-utilized worker nodes falls below the upper threshold (step 1014). Furthermore, the computer redistributes the workload optimally to the worker nodes in the worker node group based on whether a worker node is in the hot region or the cold region (step 1016). Thereafter, the process returns to step 1006 where the computer continues to collect resource utilization data at the defined time intervals.

Thus, illustrative embodiments of the present invention provide a computer-implemented method, computer system, and computer program product for rescheduling workloads across worker nodes to redistribute the workloads based on policy. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for workload redistribution of a workload scheduled and distributed on worker nodes in a worker node group within a cluster of worker node groups corresponding to a workload orchestration environment, the computer-implemented method comprising:
    defining, by a computer, an upper threshold and a lower threshold of resource utilization by the worker nodes in the worker node group within the cluster of worker node groups corresponding to the workload orchestration environment;
    determining, by the computer, a hot region and a cold region in the worker node group to provide policy-based rescheduling of the worker nodes and redistribution of workload on the worker nodes based on the upper threshold and the lower threshold of resource utilization;
    collecting, by the computer, resource utilization data corresponding to the worker nodes in the worker node group at defined time intervals;
    determining, by the computer, whether an average resource utilization of any worker node in the worker node group is greater than the upper threshold of resource utilization based on the resource utilization data;
    responsive to the computer determining that the average resource utilization of any worker node in the worker node group is greater than the upper threshold of resource utilization based on the resource utilization data, triggering, by the computer, redistribution of the workload on the worker nodes in the worker node group;
    calculating, by the computer, a centroid corresponding to the worker node group;
    calculating, by the computer, using an objective function, an energy level for the centroid;
    selecting, by the computer, a worker node in the worker node group;
    calculating, by the computer, using the objective function, an energy value for the worker node based on resource utilization and health index of the worker node; and
    calculating, by the computer, using a distance function, a distance value for the worker node and the centroid based on calculated energy levels.

2. The computer-implemented method of claim 1 further comprising:
    identifying, by the computer, those worker nodes having a respective average resource utilization greater than the upper threshold as over-utilized worker nodes;
    migrating, by the computer, the over-utilized worker nodes to the cold region in the worker node group to ensure that total resource utilization of these over-utilized worker nodes falls below the upper threshold; and
    redistributing, by the computer, the workload to the worker nodes in the worker node group based on whether a worker node is in the hot region or the cold region.

3. The computer-implemented method of claim 1 further comprising:
    determining, by the computer, whether the distance value for the worker node is greater than an overutilization delta threshold level; and
    responsive to the computer determining that the distance value for the worker node is greater than the overutilization delta threshold level, setting, by the computer, an overutilization tag of the worker node to true.

4. The computer-implemented method of claim 3 further comprising:
    determining, by the computer, whether the overutilization tag of the worker node is set to true; and
    responsive to the computer determining that the overutilization tag of the worker node is set to true, adding, by the computer, the worker node to the hot region of the worker node group.

5. The computer-implemented method of claim 1 further comprising:
    determining, by the computer, whether the distance value for the worker node is less than an average energy value for the worker node group and an underutilization delta threshold level; and
    responsive to the computer determining that the distance value for the worker node is less than the average energy value for the worker node group and the underutilization delta threshold level, setting, by the computer, an underutilization tag of the worker node to true.

6. The computer-implemented method of claim 5 further comprising:
    determining, by the computer, whether the underutilization tag of the worker node is set to true; and
    responsive to the computer determining that the underutilization tag of the worker node is set to true, adding, by the computer, the worker node to the cold region of the worker node group.

7. The computer-implemented method of claim 1 further comprising:
    calculating, by the computer, a global centroid corresponding to the cluster of worker node groups;
    selecting, by the computer, the worker node group from the cluster of worker node groups; and
    calculating, by the computer, using a distance function, a distance value for the worker node group based on the global centroid corresponding to the cluster of worker node groups.

8. The computer-implemented method of claim 7 further comprising:
    determining, by the computer, whether the distance value for the worker node group is greater than an overutilization delta threshold level; and
    responsive to the computer determining that the distance value for the worker node group is greater than the overutilization delta threshold level, setting, by the computer, an overutilization tag of the worker node group to true.

9. The computer-implemented method of claim 7 further comprising:
    determining, by the computer, whether the distance value for the worker node group is less than an underutilization delta threshold level; and
    responsive to the computer determining that the distance value for the worker node group is less than the underutilization delta threshold level, setting, by the computer, an underutilization tag of the worker node group to true.

10. The computer-implemented method of claim 1 further comprising:
    selecting, by the computer, a workload in a set of workloads running in the hot region;
    updating, by the computer, a workload deployment template corresponding to worker node groups having a cold region tag set to true based on workload placement policy and workload node affinity; and scaling down and scaling up, by the computer, the workload to allow a scheduler to move the workload to the cold region.

11. The computer-implemented method of claim 1 further comprising:
  determining, by the computer, using an objective function, a health index value corresponding to a worker node;
  determining, by the computer, whether the health index value of the worker node indicates that the worker node is unhealthy;
  responsive to the computer determining that the health index value of the worker node indicates the worker node is unhealthy, determining, by the computer, whether a new node add automatically flag and a new node available flag are set to true;
  responsive to the computer determining that the new node add automatically flag and the new node available flag corresponding to the worker node are set to true, adding, by the computer, a new worker node to the worker node group and draining, by the computer, the worker node.

12. The computer-implemented method of claim 1 further comprising:
  selecting, by the computer, a worker node from a worker nodes list in the workload orchestration environment;
  adding, by the computer, the worker node to each worker node group in a worker node groups list;
  calculating, by the computer, using a distance function, a distance value for each worker node group based on collected metrics corresponding to worker nodes of each worker node group;
  updating, by the computer, the worker node groups list with a corresponding distance value for each respective worker node group;
  selecting, by the computer, a next worker node from the worker nodes list;
  selecting, by the computer, a next worker node group from the worker node groups list;
  calculating, by the computer, using a distance function, a distance value for the selected worker node within the selected worker node group;
  determining, by the computer, whether the distance value for the selected worker node is calculated for all worker node groups; and
  responsive to the computer determining that the distance value for the worker node is calculated for all worker node groups, selecting, by the computer, a worker node group in the worker node groups list having a minimum distance from the selected worker node;
  determining, by the computer, whether the selected worker node belongs to the worker node group having the minimum distance;
  responsive to the computer determining that the selected worker node does not belong to the worker node group having the minimum distance, setting, by the computer, a regroup worker nodes flag to true, adding, by the computer, the selected worker node to the worker node group having the minimum distance, and removing, by the computer, the selected worker node from all other groups of worker nodes within the cluster of worker node groups.

13. A computer system for workload redistribution of a workload scheduled and distributed on worker nodes in a worker node group within a cluster of worker node groups corresponding to a workload orchestration environment, the computer system comprising:
  a bus system;
  a storage device connected to the bus system, wherein the storage device stores program instructions; and
  a processor connected to the bus system, wherein the processor executes the program instructions to:
    define an upper threshold and a lower threshold of resource utilization by the worker nodes in the worker node group within the cluster of worker node groups corresponding to the workload orchestration environment;
    determine a hot region and a cold region in the worker node group to provide policy-based rescheduling of the worker nodes and redistribution of workload on the worker nodes based on the upper threshold and the lower threshold of resource utilization;
    collect resource utilization data corresponding to the worker nodes in the worker node group at defined time intervals;
    determine whether an average resource utilization of any worker node in the worker node group is greater than the upper threshold of resource utilization based on the resource utilization data;
    trigger redistribution of the workload on the worker nodes in the worker node group in response to determining that the average resource utilization of any worker node in the worker node group is greater than the upper threshold of resource utilization based on the resource utilization data calculate a centroid corresponding to the worker node group;
    calculate, using an objective function, an energy level for the centroid;
    select a worker node in the worker node group;
    calculate, using the objective function, an energy value for the worker node based on resource utilization and health index of the worker node; and
    calculate, using a distance function, a distance value for the worker node and the centroid based on calculated energy levels.

14. The computer system of claim 13, wherein the processor further executes the program instructions to:
  identify those worker nodes having a respective average resource utilization greater than the upper threshold as over-utilized worker nodes;
  migrate the over-utilized worker nodes to the cold region in the worker node group to ensure that total resource utilization of these over-utilized worker nodes falls below the upper threshold; and
  redistribute the workload to the worker nodes in the worker node group based on whether a worker node is in the hot region or the cold region.

15. A computer program product for workload redistribution of a workload scheduled and distributed on worker nodes in a worker node group within a cluster of worker node groups corresponding to a workload orchestration environment, the computer program product comprising a computer readable storage medium having program instructions embodied therewith, the program instructions executable by a computer to cause the computer to perform a method comprising:
  defining, by the computer, an upper threshold and a lower threshold of resource utilization by the worker nodes in the worker node group within the cluster of worker node groups corresponding to the workload orchestration environment;

determining, by the computer, a hot region and a cold region in the worker node group to provide policy-based rescheduling of the worker nodes and redistribution of workload on the worker nodes based on the upper threshold and the lower threshold of resource utilization;

collecting, by the computer, resource utilization data corresponding to the worker nodes in the worker node group at defined time intervals;

determining, by the computer, whether an average resource utilization of any worker node in the worker node group is greater than the upper threshold of resource utilization based on the resource utilization data;

responsive to the computer determining that the average resource utilization of any worker node in the worker node group is greater than the upper threshold of resource utilization based on the resource utilization data, triggering, by the computer, redistribution of the workload on the worker nodes in the worker node group;

calculating, by the computer, a centroid corresponding to the worker node group;

calculating, by the computer, using an objective function, an energy level for the centroid;

selecting, by the computer, a worker node in the worker node group;

calculating, by the computer, using the objective function, an energy value for the worker node based on resource utilization and health index of the worker node; and calculating, by the computer, using a distance function, a distance value for the worker node and the centroid based on calculated energy levels.

16. The computer program product of claim 15 further comprising:

identifying, by the computer, those worker nodes having a respective average resource utilization greater than the upper threshold as over-utilized worker nodes;

migrating, by the computer, the over-utilized worker nodes to the cold region in the worker node group to ensure that total resource utilization of these over-utilized worker nodes falls below the upper threshold; and redistributing, by the computer, the workload to the worker nodes in the worker node group based on whether a worker node is in the hot region or the cold region.

17. The computer program product of claim 15 further comprising:

determining, by the computer, whether the distance value for the worker node is greater than an overutilization delta threshold level; and responsive to the computer determining that the distance value for the worker node is greater than the overutilization delta threshold level, setting, by the computer, an overutilization tag of the worker node to true.

18. The computer program product of claim 17 further comprising:

determining, by the computer, whether the overutilization tag of the worker node is set to true; and responsive to the computer determining that the overutilization tag of the worker node is set to true, adding, by the computer, the worker node to the hot region of the worker node group.

* * * * *